(Model.)
J. C. GUNN.
WRENCH.
No. 255,853. Patented Apr. 4, 1882.
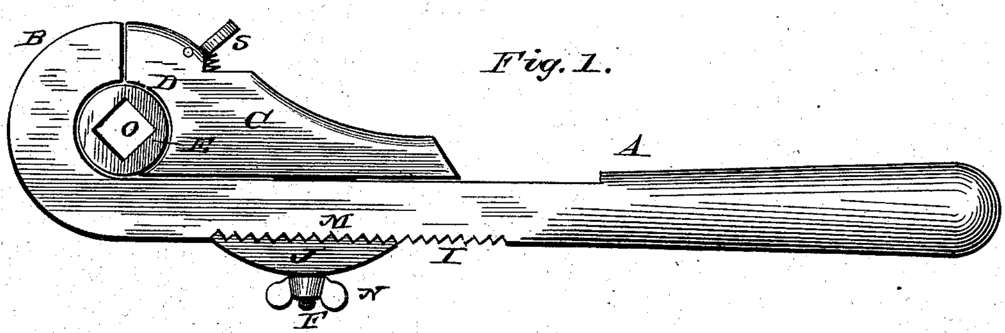
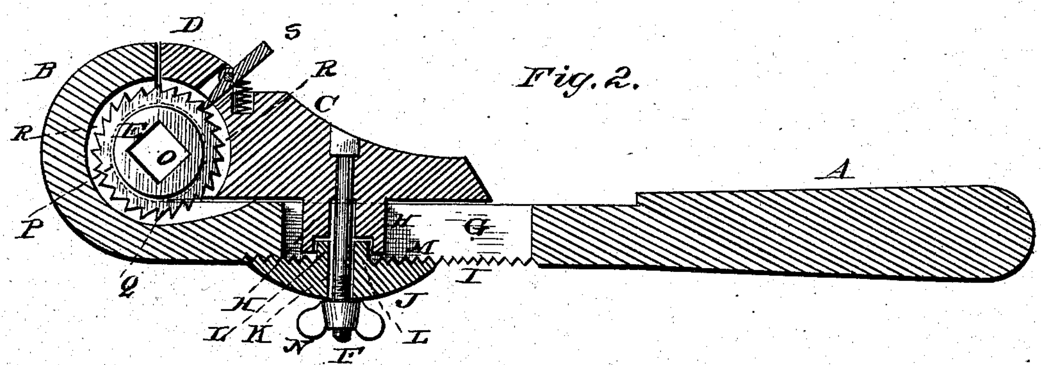
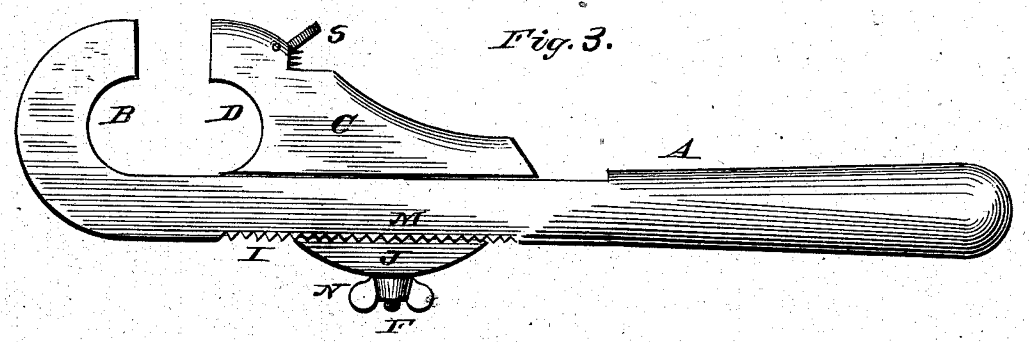
WITNESSES:
Fred. G. Dieterich.
P. C. Dieterich.
INVENTOR.
John C. Gunn,
by C. A. Snow & Co
ATTORNEYS.
N. PETERS, Photo-Lithographer, Washington, D. C.

UNITED STATES PATENT OFFICE.

JOHN C. GUNN, OF KNOXVILLE, TENNESSEE.

WRENCH.

SPECIFICATION forming part of Letters Patent No. 255,853, dated April 4, 1882.

Application filed February 23, 1882. (Model.)

*To all whom it may concern:*

Be it known that I, JOHN C. GUNN, of Knoxville, in the county of Knox and State of Tennessee, have invented certain new and useful Improvements in Wrenches; and I do hereby declare that the following is a full, clear, and exact description of the invention, which will enable others skilled in the art to which it appertains to make and use the same, reference being had to the accompanying drawings, which form a part of this specification.

Figure 1 is a side view of my improved wrench. Fig. 2 is a longitudinal sectional view of the same; and Fig. 3 is a side view of the device ready to be used as an ordinary monkey-wrench, the die having been removed.

Corresponding parts in the several figures are denoted by like letters of reference.

This invention relates to wrenches; and it consists in certain improvements in the construction of the same, which will be hereinafter fully described, and particularly pointed out in the claims.

In the drawings hereto annexed, A represents the handle, at the end of which is formed a semicircular hook, B.

C is a block sliding longitudinally upon the handle, and having at its front end a semicircular recess, D, corresponding with the hook B, and forming with the latter a circular bearing for the die E, the construction and arrangement of which will be presently described. The block C is provided on its under side with a screw or bolt, F, passing through a longitudinal slot, G, in the handle of the wrench. The block C also has lugs H arranged on either side of the screw F, and fitting in the slot G, so as to prevent the said block from turning. The under side of the handle adjoining the slot G is grooved or serrated, as at I. J is a small block, having a perforation, K, by which it is fitted upon the end of screw F, projecting through slot G on the under or back side of the wrench.

Block J is provided with lugs L, fitting in slot G, to prevent it from turning, and its under side is grooved or serrated, as at M. N is a thumb-nut adjusted upon the end of screw F.

It will be seen that when the thumb-nut N is loose the block or slide C may be moved back from the hook B as far as the length of the slot G will permit. It may be secured in any position to which it may be adjusted by tightening the nut N, which clamps the said slide and the serrated or grooved block J upon the handle.

The die E is cylindrical in shape, and is provided with an opening, O, to receive the nut which is to be operated upon, it being understood that a set of dies with openings of various sizes and shapes to be used for various purposes may be used in connection with a single wrench.

The die E has an annular flange, P, provided with teeth or ratchets Q, said flange being accommodated in a groove, R, in the bearing formed by hook B and the recess D of slide C. The latter is provided with a suitably-arranged spring-pawl, S, adapted to engage the teeth or ratchets Q of the die.

The operation of my invention will be readily understood from the foregoing description, taken in connection with the drawings hereto annexed. The die may be adjusted by moving the slide C back from the hook B a sufficient distance to enable it to be placed in its bearing in said hook. The slide C is then returned to its proper position and secured by tightening the nut N. The wrench may now be used in the usual manner for tightening nuts, operating drill-shafts, or for other purposes.

By removing the die the device may be used as an ordinary monkey-wrench, the jaws being formed, as shown in Fig. 3, by the ends of hook B and slide C, which latter may be adjusted to fit any sized nut.

Having thus described my invention, I claim and desire to secure by Letters Patent of the United States—

1. The combination of the handle A, having grooved hook B, the adjustable slide C, having grooved recess D, and spring-pawl S, and the die E, having opening O and ratchet-flange P, as set forth.

2. The combination, with the stock or handle A, having hook or jaw B, and slot G, of the slide C, having lugs H and screw F, the block J, having opening K, and the lugs L and the nut N, substantially as set forth.

In testimony that I claim the foregoing as my own I have hereto affixed my signature in presence of two witnesses.

JOHN C. GUNN.

Witnesses:

S. B. BOYD,

J. A. McDANNEL.